(12) United States Patent
Taylor (10) Patent No.: US 11,981,412 B2
(45) Date of Patent: May 14, 2024

(54) CHARGE DISTRIBUTION CIRCUIT FOR A MARINE VESSEL

(71) Applicant: Brunswick Corporation, Mettawa, IL (US)

(72) Inventor: Brad E. Taylor, Stillwater, OK (US)

(73) Assignee: Brunswick Corporation, Mettawa, IL (US)

( * ) Notice: Subject to any disclaimer, the term of this patent is extended or adjusted under 35 U.S.C. 154(b) by 657 days.

(21) Appl. No.: 17/111,656

(22) Filed: Dec. 4, 2020

(65) Prior Publication Data

US 2022/0177101 A1 Jun. 9, 2022

(51) Int. Cl.
| | | |
|---|---|---|
| *B63H 21/20* | (2006.01) | |
| *B60L 50/52* | (2019.01) | |
| *B60L 53/14* | (2019.01) | |
| *B60L 58/13* | (2019.01) | |

(52) U.S. Cl.
CPC ............. *B63H 21/20* (2013.01); *B60L 50/52* (2019.02); *B60L 53/14* (2019.02); *B60L 58/13* (2019.02)

(58) Field of Classification Search
CPC ......... B63H 21/20; B60L 53/14; B60L 50/52; B60L 58/13
See application file for complete search history.

(56) References Cited

U.S. PATENT DOCUMENTS

| | | | |
|---|---|---|---|
| 5,635,815 A | 6/1997 | Whitchurch et al. | |
| 5,764,469 A * | 6/1998 | Slepian | H02H 3/207 361/115 |
| 7,362,018 B1 | 4/2008 | Kulogo et al. | |
| 7,812,467 B1 * | 10/2010 | Lemancik | H02P 9/14 290/40 C |
| 9,444,285 B2 * | 9/2016 | Kamiya | H02J 7/02 |
| 9,948,137 B2 * | 4/2018 | Smith | H02J 3/381 |
| 9,964,029 B1 * | 5/2018 | Loberger | F01N 13/004 |
| 9,975,619 B1 * | 5/2018 | Gonring | H02P 9/48 |
| 10,017,057 B2 * | 7/2018 | Nelson | B60L 50/52 |
| 10,128,674 B2 * | 11/2018 | Nelson | B60L 58/19 |
| 2010/0144219 A1 * | 6/2010 | Balogh | B63H 21/20 192/30 R |
| 2022/0205420 A1 * | 6/2022 | Kumar | F02N 7/08 |

* cited by examiner

*Primary Examiner* — S. Joseph Morano
*Assistant Examiner* — Jovon E Hayes
(74) *Attorney, Agent, or Firm* — Andrus Intellectual Property Law, LLP (57) ABSTRACT

A marine propulsion system for a marine vessel includes a marine propulsion device, a plurality of power storage devices, and a charge distribution circuit. The marine propulsion device includes an engine and an alternator driven by the engine to generate a charge current. The plurality of power storage devices includes at least a first power storage device and a second power storage device, wherein each power storage device is configured to receive current from the alternator. The charge distribution circuit is positioned between the alternator and the plurality of power storage devices and includes an isolator configured to isolate the first power storage device from the second power storage device, a charge sensor configured to sense a charge level of the first power storage device, and a relay configured to connect and disconnect the second power storage device to/from the alternator based on the sensed charge level.

20 Claims, 4 Drawing Sheets

CHARGE DISTRIBUTION CIRCUIT FOR A MARINE VESSEL

FIELD

The present disclosure generally relates to alternator and power storage systems for a vehicle, and more particularly to systems for distributing output charge from an alternator to power storage devices on a vehicle, such as a marine vessel.

BACKGROUND

The following U.S. Patents provide background information and are incorporated herein by reference, in entirety.

U.S. Pat. No. 7,362,018 discloses an encoder alternator for an internal combustion engine which has a rotor with a plurality of circumferential magnetic rotor poles in a periodic pattern except for at least one magnetic irregularity. A sensor coil is wound around a stator pole and outputs a crankshaft position sensor signal when the magnet irregularity of the rotor passes the stator pole.

U.S. Pat. No. 7,812,467 discloses a smart alternator control circuit and method for provided limiting alternator load on an internal combustion engine.

U.S. Pat. No. 7,941,253 discloses a marine propulsion drive-by-wire control system which controls multiple marine engines, each one or more PCMs, propulsion control modules for controlling engine functions which may include steering or vessel vectoring. A helm has multiple ECUs, electronic control units, for controlling the multiple marine engines. A CAN, controller area network, bus connects the ECUs and PCMs with multiple PCM and ECU buses. The ECU buses are connected through respective isolation circuits isolating the respective ECU bus from spurious signals in another ECU bus.

U.S. Pat. No. 9,964,029 discloses a marine engine which has a cylinder block with first and second banks of piston-cylinders that are vertically aligned and extend transversely with respect to each other in a V-shape so as to define a valley there between. A crankshaft is caused to rotate by the first and second banks of piston-cylinders. A flywheel is coupled to the upper end of the crankshaft such that rotation of the crankshaft causes rotation of the flywheel. An alternator is located above the cylinder block and coupled to the flywheel such that rotation of the flywheel operates the alternator.

U.S. Pat. No. 9,975,619 discloses a method of controlling an alternator in a marine propulsion system that includes receiving a battery voltage level of a battery charged by the alternator, receiving a throttle demand value, determining whether the throttle demand value exceeds a demand threshold, and determining whether the battery voltage level exceeds a threshold minimum battery voltage. If the throttle demand value exceeds the demand threshold and the battery voltage level exceeds the threshold minimum battery voltage, then the alternator is controlled to reduce the charge current output to the battery and reduce engine output power utilized by the alternator.

U.S. Patent Publication No. 2010/0144219 discloses a marine propulsion system which is configured to allow many different combinations and interconnections between three internal combustion engines, three generators, two motors, two clutches, two marine propulsion devices, and an electrical storage device. By appropriately interconnecting these devices in advantageous combinations, energy consumption can be reduced, operational efficiency of the engine can be improved, and redundancy can be provided if one or more components are disabled.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a marine propulsion system for a marine vessel includes a marine propulsion device, a plurality of power storage devices, and a charge distribution circuit. The marine propulsion device includes an engine and an alternator driven into rotation by the engine to generate a charge current. The plurality of power storage devices includes at least a first power storage device and a second power storage device, wherein each of the plurality of power storage devices is configured to receive current from the alternator. The charge distribution circuit is positioned between the alternator and the plurality of power storage devices and includes an isolator configured to isolate the first power storage device and the second power storage device from one another, a charge sensor configured to sense a charge level of the first power storage device, and a relay configured to connect and disconnect the second power storage device to/from the alternator based on the sensed charge level.

In one embodiment, a charge distribution circuit for distributing charge current from an alternator on a vehicle to a plurality of power storage devices on the vehicle, including at least a first power storage device and a second power storage device, includes an isolator configured to isolate the first power storage device and the second power storage device from one another such that current does not flow between them, a charge sensor configured to sense a charge level of the first power storage, and a relay configured to connect and disconnect the second power storage device to the alternator based on the sensed charge level.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

The present inventor has recognized a need for a system that prioritizes charge from an alternator on a vehicle to a primary battery or other power storage device, but also has predictability and stability and isolates various power storage devices from one another such that current does not flow between them during normal operating conditions and large accumulation of current flow is avoided. The inventor has recognized that existing relay systems available for managing charge distribution from an alternator to multiple storage devices, such as voltage sensing relays (VSRs) and automatic charging relays (ACRs), are problematic because they electrically connect power storage devices together for charging purposes, often resulting in very high current flows in certain conditions. Such current flows can be difficult to manage in a safe way because the amp interrupt rating becomes unmanageably high. The high current flow is particularly problematic because it is instantaneous and abrupt, causing abrupt fluctuations in engine load due to the alternator switching on and off. Further, electrically connecting the batteries together allows current to flow from the battery with the greater charge to that with the lower charge. This is undesirable, particularly if the battery with the higher charge is the primary battery associated with primary functions related to propulsion.

The inventor has recognized that isolating, or segmenting, power storage systems on vehicles, such as on a marine vessel, is important for guaranteeing the power availability for essential functions relating to propulsion. Such segmentation facilitates dedicating a power storage device, such as a battery or bank of batteries, to propulsion systems and prevents other less critical loads, such as house loads, from draining power from the primary storage device. Further, it prevents cross failure impacts, where failure of a secondary power storage device impacts the performance and/or power availability from the primary power storage device.

Additionally, the inventor has recognized that battery isolator systems available as an alternative to relay systems are also problematic. While they offer isolation between power storage devices, existing battery isolator systems do not offer charge prioritization for a primary power storage device associated with essential functions of a vehicle, such as a marine vessel. Essential functions are those associated with propulsion, for example, such as engine crank, steering, and trim. This can lead to insufficient battery charging for the primary battery, and/or insufficient charging speed primary battery becomes low.

While segmented power storage devices and prioritized charging for a primary storage device are both desirable, currently available systems only offer one or the other feature and do not offer both. Further, some existing charge management systems are difficult to implement and maintain, requiring multiple amp interrupters and circuitous wiring, and thus is less of an installation to boat builders and other recreational vehicle manufacturers.

In view of the foregoing challenges and problems in the relevant art, the inventor has developed the disclosed power generation and storage system for a vehicle, such as for integration into a marine propulsion system, offering a charge distribution circuit that provides both channel prioritization and segmentation, or isolation, between power storage devices. The inventor further endeavored to create a charge distribution management device that can easily be installed and replaced as a single element that does not require significant installation efforts on the part of boat builders and other recreational vehicle manufacturers compared to existing ACRs and VCRs on the market.

As utilized herein, power storage device includes a battery or a battery bank comprising one or more batteries, such as one or more lead acid batteries or lithium ion batteries. The power generation and storage system is, for example, integrated into a vehicle propulsion system having an engine driving an alternator into rotation such that the alternator generates a charge current that charges the plurality of power storage devices. For example, the propulsion system may be a marine propulsion system 4 as shown in FIG. 1 comprising one or more marine propulsion devices 6 situated on a marine vessel 2 and controllable to propel the marine vessel 2.

Figure 3:
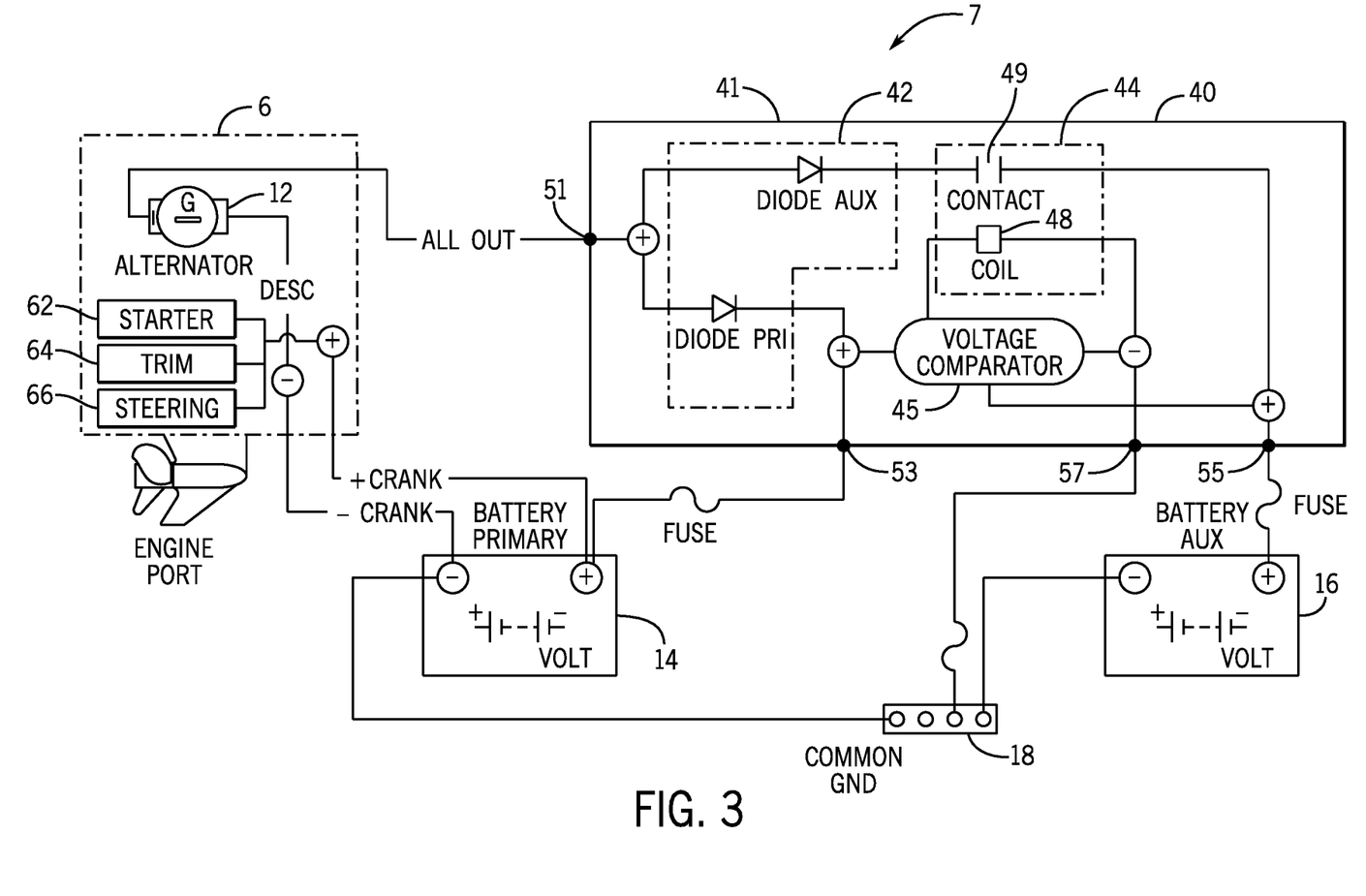
FIG. 3 depicts a power generation and storage system having a charge distribution circuit according to one embodiment of the present disclosure.

The plurality of power storage devices may include at least a first power storage device 14 and a second power storage device 16 each configured to receive charge current from an alternator 12. A charge distribution circuit 40 is positioned between the alternator 12 and the plurality of power storage devices 14, 16 and is configured to prioritize charge from the alternator 12 to maintain the primary power storage device 14 with sufficient charge available to power the propulsion system. In one embodiment, the charge distribution circuit 40 includes an isolator, a charge sensor, and a relay. The semiconductor isolator 42, such as a diode isolator or a set of MOSFETs, is configured to isolate first power storage device 14 from the second power storage device 16 such that current does not flow between them. As shown in FIG. 3, the isolator 42 may be a diode isolator comprised of a set of diodes, including a primary diode in the current path to the first power storage device 14 and an auxiliary diode in the path to the secondary power storage device 16. In another embodiment, the semiconductor isolator 42 may be a MOSFET isolator comprising a set of MOSFETs that facilitate current flow from the alternator 12 to each power storage device 14, 16 but prevent current flow back toward the alternator 12 and between the power storage devices. Charge sensor is configured to sense a charge level of the first power storage device, such as a battery voltage or a stated charge of the battery. The relay is configured to connect and disconnect the second power storage device from the alternator based on the sensed charge level of the first power storage device such that charge distribution to the first power storage device 14 is prioritized and power is only distributed to the second power storage device 16 after the first power storage device 14 is sufficiently charged. Various exemplary charge distribution circuits are illustrated and described herein.

Another benefit of the disclosed system and solution is that the complexity and components most prone to failure are concentrated on the connection between the alternator 12 and the second power storage device 16. For example, the relay 44, which is more prone to failure than the isolator 42, is configured such that it only affects power distribution to the auxiliary power storage device and not the primary power source for effectuating propulsion. The primary power source—i.e., the first power storage device 14—remains directly connected to the alternator, which minimizes the chance of catastrophic failure of the propulsion system cause by failure to charge the primary power source. Namely, failure of the charge distribution circuit 40, or any component related thereto, would not interrupt the ability for the alternator to charge the primary power storage device associated with propulsion functionalities.

Figure 1:
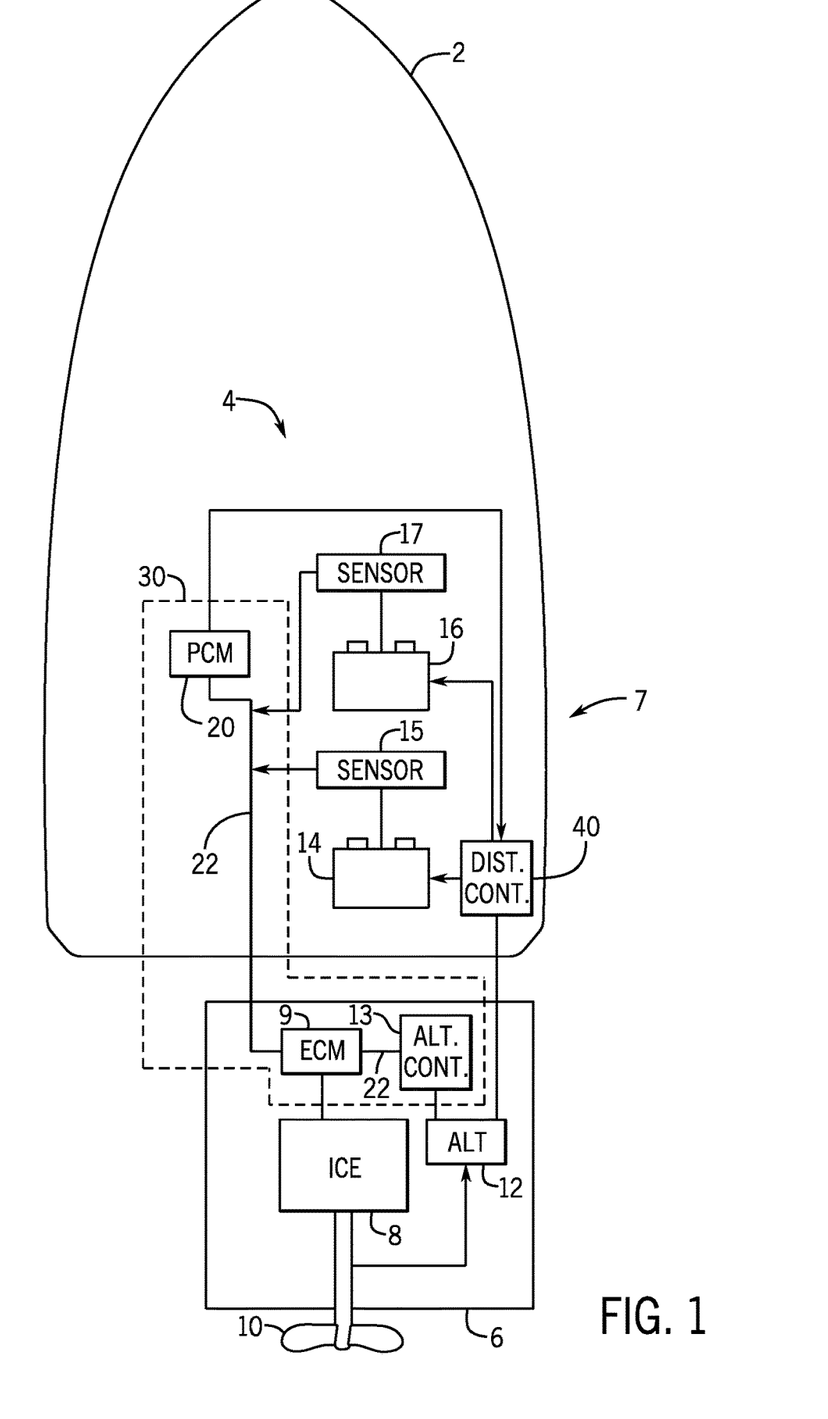
FIG. 1 is a schematic diagram of a marine propulsion system according to one embodiment of the present disclosure.

FIG. 1 depicts an exemplary embodiment of a marine propulsion system 4 configured to provide the charge distribution functionality and control described herein. In the depicted embodiment, a propulsion device 6 propels the marine vessel 2. While the propulsion device 6 is depicted as an outboard motor, in other embodiments the propulsion device 6 may be any device that propels the marine vessel, such as an inboard drive, inboard/outboard drive, stern drive, jet drive, or the like. The propulsion device 6 includes an engine 8, such as an internal combustion engine, and an engine control module (ECM) 9 that monitors and controls the engine 8. The engine 8 drives rotation of the propulsor 10, such as a propeller or impeller, in order to propel the marine vessel 2 through the water.

In addition to driving the propulsor 10 to propel the marine vessel 2, the engine 8 output also drives the alternator 12 which converts the rotational motion outputted by the engine 8 into electrical energy to charge the storage devices 14 and 16, which in turn powers the engine (such as at startup) as well as other propulsion-related devices and systems. For example, the crank shaft of the engine 8 may drive the rotor of the alternator 12, e.g., by a pulley belt, to generate electrical energy for charging the battery and/or for use by the engine 8. As is typical, the alternator has a stator supplying output power through output diodes. Some of the output power is supplied back to the alternator to generate a field current, enabling generation of electrical energy upon rotation of the rotor. Accordingly, the alternator causes a load on the engine that absorbs horsepower from the engine output. In general, the greater the engine RPM, the faster that the rotor is turned and thus the greater the amount of horsepower utilized by the alternator 12. Therefore, the alternator 12 outputs more output current to charge the storage devices 14, 16 at higher engine RPMs.

The alternator 12 is controlled by an alternator controller 13, which may provide digital and/or analog control of the alternator. In one embodiment, the alternator controller 13 may be a smart alternator control circuit responsive to one or more controllers in the system 4, such as the ECM 9, the propulsion control module (PCM) 20, and/or a dedicated controller housed with the charge distribution circuit 40. In various embodiments, the charge distribution circuit may be located on the vessel 2 near the power storage device(s) 14, 16, or elsewhere on the vessel 2, or may be co-located with the propulsion device 6 such as under-cowl on an outboard drive.

Figure 2:
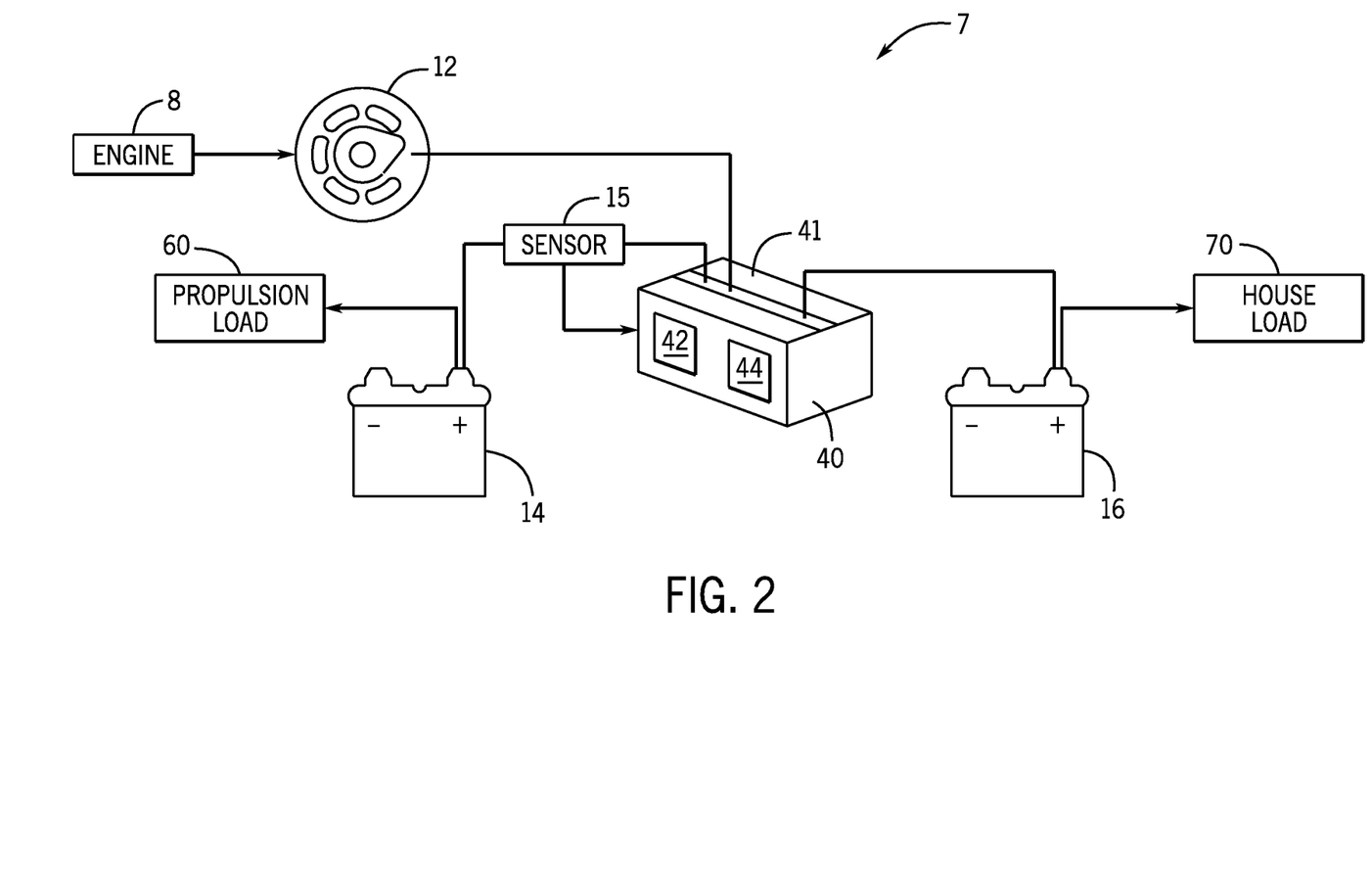
FIG. 2 depicts a power generation and storage system according to one embodiment of the present disclosure.

With reference also to FIGS. 2 and 3, the propulsion system 4 includes a power generation and storage system 7 according to the present disclosure, which comprises a plurality of power storage devices 14 and 16 charged by an alternator 12 and a charge distribution circuit 40 therebetween. The plurality of power storage devices includes a first power storage device 14 and a second power storage device 16 and may include any number of additional power storage devices. Each of the plurality of power storage devices 14, 16 is configured to receive charge current from the alternator 12 as controlled by the charge distribution circuit 40. The first power storage device 14, such as the battery or battery bank, may be configured to power the propulsion load 60. The propulsion load 60 includes devices and systems related to propulsion, such as by propulsion device 6. This may include the starter 62 configured to start, or "crank," the engine 8. The propulsion load 60 may also include one or more of a trim system 64 configured to rotate the propulsion device 6 about a horizontal axis to change the angle of the propulsor 10 with respect to the vessel 2. Various trim systems are well known within the relevant marine propulsion arts. Alternatively or additionally, the propulsion load 60 may include a steering system 66 configured to rotate the propulsion device 6 about a vertical axis in order change the angle of the propeller 10 with respect to the vessel 2, and thus change the thrust vector imparted on the vessel 2. Such steering systems 66, such as electric or electric over hydraulic systems, are well known within the marine arts. The trim system 64 and/or steering system 66 may include, for example, electric motors or pumps that consume power from the primary power storage device 14.

The secondary power storage device 16, such as a battery or battery bank, is configured to power a different load on the vehicle, such as the house load 70. In the example of a marine vessel, the house load may include, for instance, stereo or entertainment devices, guidance systems, appliances, HVAC systems, or the like. The distribution circuit 40 is configured to isolate the first power storage device 14 and the second power storage device 16 from one another such that current does not flow between them and cannot flow between them during normal operating conditions where all of the components are operating properly. Thus, the house load 70 only draws from the second power storage device 16 and the propulsion load 60 only draws from the first power storage device, which may also be referred to as a primary power storage device. The charge distribution circuit 40 is configured to prioritize charging the primary power storage device 14 and to only distribute charge current to the second power storage device 16 when the first power storage device 14 is sufficiently charged. Thus, control of charge current delivery to the second power storage device 16 is based on a sensed charged level of the primary power storage device.

One or more sensors 15, 17 are configured to sense the charge levels of the battery. Charge sensor 15 is configured to sense a charge level of the first power storage device 14 and charge sensor 17 is configured to sense a charge level of the second power storage device 16. In certain embodiments described below with respect to FIG. 3, the charge sensors 15, 17 may be a voltage comparator 45 that compares the voltages of the first and second power storage devices 14 and 16.

A relay 44 is configured to control connection of the second power storage device based on output of the charge sensor 15 associated with the first power storage device 14. For example, the relay 44 may be an electrically operated switch controlled and energized based on whether the primary power storage device 14 meets a threshold condition. The relay 44 may be a solid-state relay, such as a field effect transistor (e.g., a MOSFET) or an electromechanical relay, such as a mechanical switch. For example, the solenoid 48 (FIG. 3) may be energized based on whether the charge level of the primary battery 14 meets a threshold condition. In some embodiments, the logic for energizing the solenoid may further be based on the charge level of the secondary battery 16 as well.

In certain embodiments, the charge distribution circuit 40 is contained in a housing 41 such that it can be connected and disconnected into the power generation and storage system 7, such as at system configuration and/or for maintenance or replacement. For example, the housing 41 may house the isolator 42, the one or more charge sensors 15, 17, 45, and the relay 44. In some embodiments, a controller may also be contained in the housing 41. The housing 41 provides a modular device that can be relatively easily connected and connected from the system 4. The housing 41 may be configured to provide connectors for easy connection with the output of the alternator 12 and the power storage device inputs. In the example at FIG. 3, the housing 41 of the charge distribution circuit 40 includes an alternator connector 51 that connects to the output of the alternator 12 to receive charge current, a first storage device connector 53 that connects to a positive terminal of the first storage device 14, and a second storage device connector 55 that connects to the positive terminal of the second power storage device 16. A common ground connector 57 connects to the common ground 18. In embodiments with an integrated controller, a data connection may also be provided, such as to receive information from the charge sensor 15. In other embodiments, elements of the charge distribution circuit 40 may be separated and/or housed separately from one another.

The charge sensors 15, 17 comprise part of the charge distribution circuit 40, though they are shown separately in FIGS. 1 and 2. In certain embodiments such as that exemplified at FIG. 3, the charge sensor 15 may be internal to the housing 41 that houses charge distribution circuit 40 elements. In other embodiments, one or more of the sensors 15, 17 may be external to the housing 41.

In the embodiment at FIG. 3, the charge sensor 15 may be a voltage comparator 45 configured to compare a voltage level of the first power storage device 14 to a voltage level of the second power storage device 16. As illustrated in FIG. 3, the charge distribution circuit 40 may include a voltage comparator 45 connected at the positive terminals of each of the first power storage device 14 and the second power storage device 16 and to common ground. The output of the voltage comparator 45 operates the relay 44. Specifically, the output of the voltage comparator 45 energizes or deenergizes the coil 48. The coil 48 in turn controls the position, either open or closed, of the contact 49. Thereby, the voltage comparator 45 controls the relay 44, which is configured to connect and disconnect the second power storage device 16 to the alternator 12. As described above, the contact 49 may comprise a solid state device, such as a field effect transistor (e.g., a MOSFET) or a mechanical switch.

In other embodiments, charge sensor 15 may be a voltage sensor configured to sense a voltage level of the first power storage device, or any other sensor configured to sense current or voltage relating to the charge level or state of charge of the first power storage device. For instance, the charge sensor 15 may be a state of charge (SOC) sensor configured to determine a state of charge of the first power storage device 14. In certain embodiments, a second sensor 17 may be configured to sense a charge level of the second power storage device, such as battery voltage level or other SOC measurement. Such information may further be utilized in certain embodiments to control charge distribution and/or to provide information to an operator regarding the charge level, or state of charge, of the second power storage device. To provide just a few examples, the each of charge sensors 15, 17 may be, for instance, a MasterShunt 500 by Power Products, LLC of Menomonee Falls, Wisconsin or an intelligent battery sensor (IBS), such as the HELLA Intelligent Battery Sensor (IBS) by HELLA Manufacturing Company of Lippstadt, Germany.

The voltage comparator 45 and relay 44 are configured such that the second power storage device 16 is disconnected from the alternator 12 when the primary power storage device 14 is not sufficiently charged and thus does not meet a threshold condition. Conversely, the charge sensor 15, 45 and the relay 44 is configured to connect the second power storage device 16 to the alternator 12 when the charge level of the first storage device 14 meets the threshold condition. For example, the voltage comparator 45 and relay 44 are configured to disconnect the second power storage device 16 from the alternator 12 when the voltage of the first power storage device 14 is less than the voltage of the second power storage device and to connect the second power storage device to receive charge current from the alternator when the voltage of the first power storage device 14 is greater than the voltage of the second power storage device.

In other embodiments, the voltage comparator 45 and/or other control device may be configured to disconnect the second power storage device 16 from the alternator 12 when the charge level, such as the battery voltage level, is less than a threshold charge level, such as a threshold voltage, and conversely to connect the second storage device 16 for charging when the battery voltage level for the first storage device 14 is greater than the threshold voltage. The threshold charge, or threshold voltage, may represent a fully charged battery, or some charge level less than a full charge capacity but sufficient to power certain essential functions (e.g., powering the starter 62 to start the engine and/or powering steering of the propulsion device during low speed operation).

In some embodiments, the charge distribution circuit 40 may include a controller configured to control the relay 44 based on the sensed charge level of the first power storage device 14. The controller may be configured to control the relay 44 based on a comparison of the first and second power storage devices 14 and 16, or based on a comparison of the first power storage voltage, or other charge level measurement, to a threshold. In certain embodiments, the controller may be a dedicated controller incorporated and housed within the housing 41 for the charge distribution circuit 40. In other embodiments, a controller within a control system for the vehicle, such as a marine vessel, may be configured to provide the control functions described herein. As used herein, the term controller may refer to, be part of, or include an application-specific integrated circuit (ASIC), an electronic circuit, a combinational logic circuit, a field programmable gate array (FPGA), a processor (shared, dedicated, or group) that executes code, or other suitable components that provide the described functionality, or a combination of some or all of the above, such as in a system-on-chip.

Referring again to FIG. 1, the control system 30 in the marine vessel includes one or more controllers, which are exemplified as the alternator controller 13, the engine control module (ECM) 9, and the propulsion control module (PCM) 20. Any of these controllers, or another controller within the control system 30 on the vessel 2 may be configured to receive the charge level information from the sensor 15 and control the relay 44 (FIG. 3) accordingly. The controllers 13, 9, and 20 are communicatively connected via a communication bus 22, and the sensor 15 is also configured on the communication bus 22. Thereby, sensed charge level by the sensor 15 can be received at any one or more of the controllers within the control system 30 communicating on the communication bus 22. In one example, the communication bus 22 may be operated as a CAN bus, such as exemplified in U.S. Pat. No. 6,273,771. In other embodiments, the communication bus 22 may be a local interconnect network (LIN) bus. In still other embodiments, one or more the controllers 13, 9, 20 within the control system 30 may communicate via a separate CAN bus, LIN bus, or other type of communication bus or communication link (such as a dedicated link). In still other embodiments, the control modules within the control system 30 and/or the sensor 15 may communicate via a wireless communication protocol.

Figure 4:
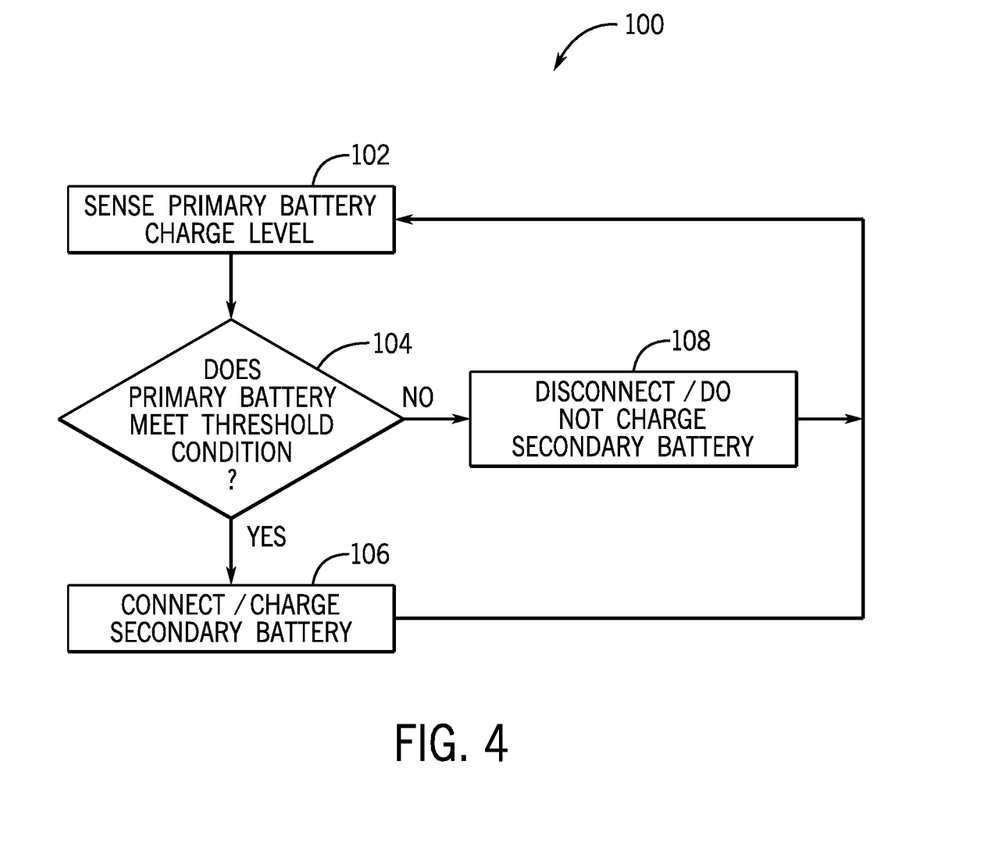
FIG. 4 is a flowchart illustrating a method for distributing charge according to one embodiment of the present disclosure.

FIG. 4 depicts an exemplary method 100 executed by a charge distribution circuit 40, which may take on various embodiments described herein. The method 100 of controlling charge distribution includes sensing a primary battery charge level at step 102, which may include determining a voltage of the first power storage device 14. In other embodiments, the primary battery charge level may be a state of charge determination based on current measurement techniques, such as coulomb counting. If the primary battery meets a threshold condition at step 104, then the secondary battery, or battery bank, gets connected and charged by the alternator at step 106. If, on the other hand, the primary battery does not meet the threshold condition at step 104, then the secondary battery is disconnected and does not receive output from the alternator at step 108. Primary battery charge level is continually monitored and charge current is distributed accordingly.

In various embodiments, the threshold condition may be a threshold state of charge, such as a threshold battery voltage, or may be based on a comparison between the state of charge of the first power storage device and that of the second power storage device. For example, the threshold condition may be that the state of charge, such as the voltage level, of the first power storage device 14 is greater than that of the second power storage device. In various embodiments, the threshold condition determination at step 104 may be made by a controller, such as a dedicated controller within the housing 41 or by a controller within the control system 30 of the marine vessel. In other embodiments, the threshold condition determination at step 104 may be provided by a voltage comparator, e.g., voltage comparator 45 in the example at FIG. 3.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

I claim:

1. A marine propulsion system for a marine vessel comprising:
    a marine propulsion device including an engine and an alternator driven by the engine and configured to generate a charge current;
    a plurality of power storage devices including at least a first power storage device and a second power storage device, wherein each of the plurality of power storage devices is configured to receive the charge current from the alternator;
    a charge distribution circuit positioned between the alternator and the plurality of power storage devices, the charge distribution circuit including:
        an isolator configured to isolate the first power storage device and the second power storage device from one another;
        a charge sensor configured to sense a charge level of the first power storage device; and
        a relay configured to connect and disconnect the second power storage device to the alternator based on the charge level.

2. The marine propulsion system of claim 1, wherein the charge distribution circuit is configured to connect the second power storage device to the alternator when the charge level of the first power storage device meets a threshold condition.

3. The marine propulsion system of claim 1, wherein the charge sensor is a voltage comparator configured to compare a voltage of the first power storage device to a voltage of the second power storage device and provide an output based on the comparison.

4. The marine propulsion system of claim 3, wherein the relay is configured to connect the second power storage device to the alternator based on the output of the voltage comparator such that the second power storage device receives charge current when the voltage of the first power storage device is greater than the voltage of the second power storage device.

5. The marine propulsion system of claim 1, wherein the charge sensor is a voltage sensor configured to sense a voltage level of the first power storage device.

6. The marine propulsion system of claim 5, further comprising a controller configured to control the relay based on the voltage level of the first power storage device.

7. The marine propulsion system of claim 6, wherein the controller is configured to compare the voltage level of the first power storage device to a threshold voltage and to control the relay based on the comparison.

8. The marine propulsion system of claim 7, wherein the controller is configured to control the relay to connect the second power storage device to the alternator when the voltage level of the first power storage device is greater than the threshold voltage and disconnect the second power storage device from the alternator when the voltage level of the first power storage device is less than the threshold voltage.

9. The marine propulsion system of claim 1, wherein the charge sensor is configured to determine a state-of-charge of the first power storage device, and wherein the charge distribution circuit is configured to connect the second power storage device to the alternator when the state-of-charge of the first power storage device meets a threshold condition.

10. The marine propulsion system of claim 1, wherein each of the first power storage device and the second power storage device is a battery or a bank of batteries.

11. The marine propulsion system of claim 1, wherein the marine propulsion device includes a starter, and wherein the first power storage device is configured to power the starter.

12. The marine propulsion system of claim 1, wherein the second power storage device is configured to power a house load on the marine vessel.

13. A charge distribution circuit for distributing charge current from an alternator on a vehicle to a plurality of power storage devices on the vehicle, including at least a first power storage device configured to power a starter of a propulsion device on a marine vessel and a second power storage device, the charge distribution circuit comprising:
    an isolator configured to isolate the first power storage device and the second power storage device from one another such that current does not flow between them;
    a charge sensor configured to sense a charge level of the first power storage device; and
    a relay configured to connect and disconnect the second power storage device to the alternator based on the charge level.

14. The charge distribution circuit of claim 13, wherein the charge distribution circuit is configured to connect the second power storage device to the alternator when the charge level of the first power storage device meets a threshold condition.

15. The charge distribution circuit of claim 13, wherein the charge sensor is a voltage comparator configured to compare a voltage of the first power storage device to a voltage of the second power storage device and provide an output based on the comparison.

16. The charge distribution circuit of claim 15, wherein the relay is configured to connect the second power storage device to the alternator based on the output of the voltage comparator such that the second power storage device receives charge current when the voltage of the first power storage device is greater than the voltage of the second power storage device.

17. The charge distribution circuit of claim 13, wherein the charge sensor is a voltage sensor configured to sense a voltage level of the first power storage device.

18. The charge distribution circuit of claim 17, wherein the charge distribution circuit is configured to connect the second power storage device to the alternator when the voltage level of the first power storage device is greater than a threshold voltage.

19. The charge distribution circuit of claim 13, wherein each of the first power storage device and the second power storage device is a battery or a bank of batteries.

20. The charge distribution circuit of claim 13, wherein the isolator is one of a diode isolator and a MOSFET isolator.

* * * * *